United States Patent Office 3,631,048
Patented Dec. 28, 1971

3,631,048
PIGMENTS OF THE PERYLENETETRAACETIC
CARBOXYLIC ACID DIIMIDE SERIES
Georg Anton Klein, Bottmingen, Basel-Land, Switzerland,
assignor to Ciba-Geigy AG, Basel, Switzerland
No Drawing. Filed July 14, 1970, Ser. No. 54,858
Int. Cl. C07d 91/62
U.S. Cl. 260—281       6 Claims

ABSTRACT OF THE DISCLOSURE

Perylenetetraacetic carboxylic acid diimides are prepared by condensing perylene - 3,4,9,10 - tetracarboxylic acid with 2-aminothiadiazoles. The new perylene derivatives are used as pigments.

DESCRIPTION OF THE INVENTION

The invention concerns new compounds of the perylenetetracarboxylic acid diimide series, their use for the pigmenting of high-molecular organic material, and the compositions thereof.

It has been found that compound of Formula I

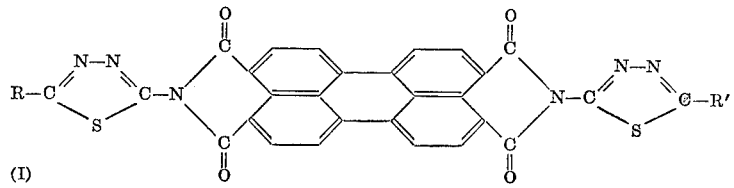

(I)

wherein

R and R' are identical or different, and each represent hydrogen, an alkyl group having 1–4 carbon atoms, a phenyl group optionally substituted by chlorine; chlorine, the mercapto group, the amino group, or the phenylamino group, are deeply coloured and brilliant bluish red pigments which possess excellent fastness properties, such as fastness to light, migration, cross-lacquering, heat, and solvents. Such pigments are very valuable commercially, and are sought after since of the prior known pigments of similar chemical structure, only a few satisfy the requirements with regard to fastness, and none attain the brilliance and colour strength of the pigments according to the invention.

When R and R' in Formula I are identical, then the pigments are symmetrically formed, which is preferred. Where R denotes an alkyl group with 1 to 4 carbon atoms, it is generally the methyl group, the ethyl group, the propyl group, the isopropyl group, or the butyl group, preferably however the methyl group. Also preferred is moreover a pigment whereby R denotes the phenyl group, an o- or p-chlorophenyl group or the amino group.

The new pigments are produced by condensing perylene-3,4,9,10-tetracarboxylic acid, or a reactive acid derivative thereof, with two identical or different 2-aminothiadiazoles of Formula II:

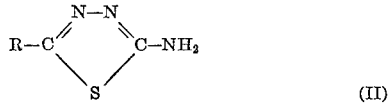

(II)

wherein R has the meanings given in Formula I.

Condensation is preferably performed in high-boiling solvents, such as quinoline, trichlorobenzene, diphenylene oxide, diphenyl, or mixtures thereof. In the case of using pyridine as the solvent, it is advantageous to condense at temperatures above the normal boiling point, in pressure vessels, preferably at 200 to 230° C. Used, if necessary, for the condensation process are condensation agents such as hydrochloric acid, concentrated acetic acid, anhydrous zinc chloride, or zinc salts or cadmium salts of organic carboxylic acids such as, e.g. zinc formate, zinc acetate, zinc stearate, cadmium acetate, or the zinc salts of benzoic acid, phthalic acid, phenylacetic acid, and nicotinic acid. Particularly suitable for the purpose is zinc acetylacetonate; in the presence of this the reaction proceeds rapidly and in good yield. In general, 0.1 to 1 mole of zinc acetylacetonate per mole of perylenetetracarboxylic acid is used in the condensation process; but it is also possible to add more condensation agent. The reaction proceeds satisfactorily, however, even without the addition of a condensation agent. Moreover, the pigments can also be produced by the melting together of the two constituents; the obtained pigment is then washed with dilute potassium hydroxide solution and with water, and afterwards dried and ground. It preferably undergoes a further grinding in the presence of salts such as calcium chloride, whereupon it is finally separated from the salt.

By condensing per mole of perylenetetracarboxylic acid-3,4,9,10-dianhydride, 1 mole each of thiadiazoles varyingly substituted in the 5-position, unsymmetrically substituted perylenetetracarboxylic acid diimides of Formula I are obtained.

The new compounds according to the invention are suitable for the dyeing of high-molecular organic materials, e.g. for the pigmenting of lacquers, also metal-effect lacquers, plastic masses, such as hard or plasticiser-containing polyvinyl chloride, polyethylene, polypropylene, polyurethane, polycarbonate, polystyrene, polyacrylonitrile, for the spinning-dyeing of synthetic fibres, or as printing ink. The pigment can be used direct, or after being converted into a finely dispersed form. The compounds can also be used as vat dyestuff. In the following examples, the temperature is given in ° C.

Example 1

(1.1) N,N' - bis - (2 - methyl - 1,3,4 - thiadiazolyl-5)-perylene-3,4,9,10-tetracarboxylic acid diimide.—In a four-necked flask of 350 ml. content, fitted with thermometer, stirrer and fractionating column, and containing 150 g. of quinoline, an amount of 8 g. of perylenetetracarboxylic acid-3,4,9,10-dianhydride is stirred in; the whole is heated to 237°, until pure quinoline distils over; to the suspension at 200° are slowly added 4.6 g. of 2-amino-5-methylthiadiazole-1,3,4, and stirring is maintained at 220° for five hours. The mixture is then cooled to 150°, filtered off under suction; and the red crystalline residue is washed with 200 ml. of hot quinoline, 200 ml. of glacial acetic acid, and 50 ml. of methyl alcohol. After being dried in a vacuum of 15 mm. Hg at 60°, the weight of the residue is 12 g.

These 12 g. of N,N'-bis-(2-methyl-1,3,4-thiadiazolyl-5)-perylene-3,4,9,10-tetracarboxylic acid diimide are ground in a vibrating mill of one litre capacity with 3.6 kg. of steel balls having a diameter of 1.5 cm., 60 g. of calcium chloride, and 4.5 g. of special petroleum which boils between 165 and 200°. The ground material is afterwards suspended in 500 ml. of 1 N hydrochloric acid; the suspension is stirred at 80° during one hour, and filtered off under suction; the residue is then washed with one litre of hot water, and dried in a vacuum of 15 mm. Hg at 60°. In this manner are obtained 11.1 g. of a very pure bluish red pigment of high colour strength and having excellent fastness to light, migration, cross-lacquering, heat, and solvents.

If, instead of the applied 2-aminothiadiazole-1,3,4 having a methyl group in the 5-position, equivalent amounts of such 2-aminothiadiazole-1,3,4 which contain in the 5-position the following substituents R of Formula II are condensed with perylenetetracarboxylic acid-3,4,9,10-dianhydride, then likewise are obtained pigments of Formula I, wherein R and R' are identical, possessing similar properties:

| Pigment | Substituent in 5-position | Colour of the pigment |
|---|---|---|
| 1.2 | Ethyl group | Bluish red. |
| 1.3 | Isopropyl group | Do. |
| 1.4 | Phenyl group | Do. |
| 1.5 | o-Chlorophenyl group | Do. |
| 1.6 | p-Chlorophenyl group | Do. |
| 1.7 | 3,4-dichlorophenyl group | Do. |
| 1.8 | Chlorine | Do. |
| 1.9 | Mercapto group | Do. |
| 1.10 | Hydrogen | Do. |
| 1.11 | Amino group | Do. |
| 1.12 | Phenylamino group | Brown. |

Example 2

(2.1) N-[2-(o-chlorophenyl) - 1,3,4 - thiadiazol-5-yl]-N'-[2-methyl-1,3,4-thiadiazol - 5 - yl] - perylenetetracarboxylic acid-3,4,9,10-diimide.—Into a flask with stirrer and with fractionating column are placed 150 g. of quinoline, 0.26 g. of zinc acetonylacetate, 8 g. of perylenetetracarboxylic acid-3,4,9,10-dianhydride, 4.4 g. of 2-amino-5-(o-chlorophenyl)-thiadiazole-1,3,4 and 2.4 g. of 2-amino-5-methylthiadiazole-1,3,4.

This mixture is vigorously stirred, heated to 220°, maintained for two hours at this temperature, cooled to 150°, and filtered. The residue is washed three times with 100 ml. of quinoline each time, once with 100 ml. of glacial acetic acid, three times with 100 ml. of methanol each time; and is then dried at 60° in a container under a pressure of 15 mm. Hg. After 12 hours, the obtained 12.4 g. of crystals are ground for two hours in a vibrating mill of one litre capacity and filled with 3.6 kg. of steel balls of 1.5 cm. diameter; together with 70 g. of calcium chloride and 4 g. of special petroleum (B.P.=165–200°).

After one hour of stirring in 500 ml. of 1 N hydrochloric acid at 80°, filtration and drying at 60° (vac$_{15\text{ mm.}}$), the ground material is obtained consisting of 11.7 g. of N-[2-(o-chlorophenyl)-1,3,4-thiadiazol - 5 - yl]-N'-[2-methyl-1,3,4 - thiadiazol - 5 - yl]-perylenetetracarboxylic acid-3,4,9,10-diimide, a somewhat bluish red pigment, but otherwise possessing similarly good properties to those of the pigment described in Example 1.1.

If, instead of 2-amino-5-(o-chlorophenyl)-thiadiazole-1,3,4 equivalent amounts of 2-aminothiadiazoles having the following substituents in the 5-position are used, then pigments possessing similar properties are obtained:

| Pigment | Substituent in the 5-position | Shade of the pigment |
|---|---|---|
| 2.2 | p-Chlorophenyl | Bluish red. |
| 2.3 | Phenyl | Do. |

Example 3

4 g. of N,N'-bis-(5 - phenyl) - 1,3,4 - thiadiazolyl-2)-perylenetetracarboxylic acid-3,4,9,10-diimide, 36 g. of aluminium hydroxide, 60 g. of linseed-oil varnish of medium viscosity, and 0.2 g. of cobalt linoleate are mixed on a three-roller mill, and ground. A printing ink is obtained which gives bluish red paper printings having good fastness to light.

Example 4

An amount of 1 g. of the pigment according to Example 1.1, and 5 g. of titanium dioxide are added to 100 g. of a stoving lacquer consisting of 58.5 g. of a 60% solution of a coconut-oil fatty acid modified alkyd resin in xylene, 23 g. of a 65% solution of a melamine lacquer resin in butanol, 17 g. of xylene and 1.5 g. of butanol. After 48 hours grinding of the mixture in a ball mill, the thus pigmented lacquer is sprayed onto a cleaned metal surface. The bluish red coating has, after stoving at 120°, a very good fastness to light, cross-lacquering and to weather.

Example 5

An amount of 6.7 g. of polyvinyl chloride powder (suspension polymerisate), 33 g. of dioctylphthalate, 2 g. of dibutyl tin dilaurate, 0.3 g. of a stabiliser based on phosphate, and 0.7 g. of the pigment produced according to Example 1 by condensation of perylenetetracarboxylic acid - 3,4,9,10 - dianhydride and 2-amino-5-methylthiadiazole 1,3,4, is mixed and then processed for 15 minutes on mixing rolls heated to 160°. A sheet of 0.4 mm. thickness is afterwards produced on a calendering machine. The bluish red dyeing of the sheet is heat-resistant and has fastness to migration and light.

What I claim is:

1. Compounds of the Formula I

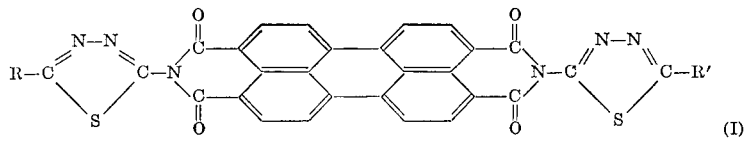

wherein R and R' are identical or different, and each represent hydrogen, an alkyl group having 1–4 carbon atoms, an unsubstituted phenyl group or a phenyl group which is substituted by chlorine; chlorine, the mercapto group, the amino group of the phenylamino group.

2. A compound according to claim 1 which is N,N'-bis-(2 - methyl - 1,3,4-thiadiazolyl-5)-perylene-3,4,9,10-tetracarboxylic acid diimide.

3. A compound according to claim 1 which is N,N'-bis-(2 - phenyl - 1,3,4-thiadiazolyl-5)-perylene-3,4,9,10-tetracarboxylic acid diimide.

4. A compound according to claim 1 which is N,N'-bis-(2-o-chlorophenyl-1,3,4-thiadiazolyl-5)-perylene-3,4,9,10-tetracarboxylic acid diimide.

5. A compound according to claim 1 which is N,N'-bis-(2-p-chlorophenyl-1,3,4-thiadiazolyl-5)-perylene-3,4,9,10-tetracarboxylic acid diimide.

6. A compound according to claim 1 which is N,N'-bis-(2 - amino - 1,3,4-thiadiazolyl-5)-perylene-3,4,9,10-tetracarboxylic acid amide.

References Cited

UNITED STATES PATENTS

| 3,332,931 | 7/1967 | Braun | 260—281 X |
| 3,357,983 | 12/1967 | Weener et al. | 260—281 |
| 3,546,222 | 12/1970 | Irving et al. | 260—249.6 |

FOREIGN PATENTS 894,859   4/1962   Great Britain _____ 260—218

DONALD G. DAUS, Primary Examiner

U.S. Cl. X.R.

8—34; 106—288 O; 260—37 N, 37 NP, 302 D